US011010441B2

(12) United States Patent
Bao

(10) Patent No.: US 11,010,441 B2
(45) Date of Patent: May 18, 2021

(54) METHOD FOR ACCURATELY SEARCHING WITHIN WEBSITE

(71) Applicant: SHENZHEN SEKORM COMPONENT NETWORK CO., LTD, Guangdong (CN)

(72) Inventor: Wei Bao, Guangdong (CN)

(73) Assignee: SHENZHEN SEKORM COMPONENT NETWORK CO., LTD, Shenzhen (CN)

( * ) Notice: Subject to any disclaimer, the term of this patent is extended or adjusted under 35 U.S.C. 154(b) by 121 days.

(21) Appl. No.: 16/462,218

(22) PCT Filed: Oct. 20, 2017

(86) PCT No.: PCT/CN2017/107112
§ 371 (c)(1),
(2) Date: May 18, 2019

(87) PCT Pub. No.: WO2018/090786
PCT Pub. Date: May 24, 2018

(65) Prior Publication Data
US 2019/0332636 A1 Oct. 31, 2019

(30) Foreign Application Priority Data
Nov. 18, 2016 (CN) .......................... 201611018569.6

(51) Int. Cl.
G06F 16/00 (2019.01)
G06F 16/9535 (2019.01)
(Continued)

(52) U.S. Cl.
CPC .... *G06F 16/9535* (2019.01); *G06F 16/24564* (2019.01); *G06F 16/24578* (2019.01);
(Continued)

(58) Field of Classification Search
CPC ........... G06F 16/9535; G06F 16/24578; G06F 16/951; G06F 16/9538; G06F 16/954; G06F 16/24564; G06F 16/90324
(Continued)

(56) References Cited

U.S. PATENT DOCUMENTS 10,516,587 B2 * 12/2019 Brunets ............ G06Q 10/06398
2007/0150457 A1 * 6/2007 Goldman ................ G06F 16/34
(Continued)

FOREIGN PATENT DOCUMENTS

| CN | 102446180 A | 5/2012 |
| CN | 102591972 A | 7/2012 |
| CN | 103744866 A | 4/2014 |

OTHER PUBLICATIONS

International Search Report of PCT Patent Application No. PCT/CN2017/107112 dated Jan. 19, 2018.

*Primary Examiner* — Irete F Ehichioya
*Assistant Examiner* — Shirley D Hicks

(57) ABSTRACT

A method for accurately searching within a website is disclosed, which comprising: a search box obtaining a search term inputted and sending the search term to a dynamic matching unit; the dynamic matching unit performing query matching in different libraries according to a preset query rule to obtain search results, search results containing a plurality of merchandise information; ranking the search results according to a preset ranking rule, and displaying them in a pull-down list; each of the search results containing a merchandise name and a function button; and clicking the function button for jumping to a preset function page displaying the corresponding function information. In such a way, ranking of the search results is more reasonable and requirements. Meanwhile, the user can quickly perform such operations as search, read, download, (Continued)

and purchase, so as to reduce operation steps and improve user experience.

5 Claims, 8 Drawing Sheets

(51) Int. Cl.
*G06F 16/2457* (2019.01)
*G06F 16/951* (2019.01)
*G06F 16/9538* (2019.01)
*G06F 16/954* (2019.01)
*G06F 16/2455* (2019.01)

(52) U.S. Cl.
CPC .......... *G06F 16/951* (2019.01); *G06F 16/954* (2019.01); *G06F 16/9538* (2019.01)

(58) Field of Classification Search
USPC ........................................................ 707/722
See application file for complete search history.

(56) References Cited

U.S. PATENT DOCUMENTS

| | | | |
|---|---|---|---|
| 2012/0166450 A1* | 6/2012 | Choi | G06F 16/24534 707/748 |
| 2015/0227972 A1* | 8/2015 | Tang | G06Q 30/0255 705/14.53 |
| 2017/0091883 A1* | 3/2017 | Greystoke | G06Q 30/0619 |

* cited by examiner

Order information of ACPM-7717

Quantity required

Unit price

Postal address

Contact person

Confirm the order

Purchase function display page

FIG. 10

METHOD FOR ACCURATELY SEARCHING WITHIN WEBSITE

BACKGROUND OF THE INVENTION

Field of the Invention

The invention relates to the field of searching, and specifically to a method for accurately searching within a website.

Related Art

In the field of e-commerce, sellers display and sell the merchandises on the website. Generally, the website categories the merchandises in accordance with their attributes such as variety, price, sales volume, making them easy for the user to view and purchase. However, if there are too many merchandises on the website, it is difficult to find one by one, and it is a waste of time. Therefore, the current website provides search service within the website, and when the user inputs a search term of the merchandise to be searched in a search box, the website server searches according to the search term, rapidly locks the item and displays it on a page of search results for the user to view.

However, currently, this search method is tedious in operation. The website can only search according to the search term, and display the search results on a new page, and the user needs to view on the new page, and then performs such operations as read, download and purchase. For example, when the user needs to purchase a component marked with a model AAA, the user inputs AAA in a search box of the website, clicks search, then, the website displays the searched merchandises containing the search term AAA on a display page, and the user clicks the search results of AAA before entering into an operation interface of purchase, so the process is tedious.

Furthermore, the current e-commerce website considers few factors in searching, and the search results are often invariable, and then cannot be adapted to search requirements of different groups of people at different time, so the search results are unreasonable. For example, professional customers and ordinary customers have different requirements, the customers have different requirements in working time and spare time, and the merchants themselves also have different sales strategies for the merchandises, so it needs to make continuous adjustments, but the current e-commerce website cannot satisfy it.

SUMMARY OF THE INVENTION

Technical Problem

The technical problem to be solved by the invention is to provide a method for accurately searching within a website against deficiencies of tedious searching within the website and unreasonable ranking of the search results in the prior arts described above.

Solution of Problem

Technical Solution

The technical solution of the invention adopted to solve the technical problem is to construct a method for accurately searching within a website, comprising steps of:

search box obtaining a search term inputted by a user and sending the search term to a dynamic matching unit;

according to the search term, the dynamic matching unit performing query matching in different libraries on a server according to a preset query rule to obtain search results, said search results containing a plurality of merchandise information;

ranking the search results according to a preset ranking rule, and displaying the ranked search results in a pull-down list of the search box;

each of the search results containing a merchandise name and a function button corresponding to the merchandise name;

clicking the function button and jumping to a preset function page corresponding to the function button, and the preset function page displaying the corresponding function information.

Further, regarding the method for accurately searching within a website of the invention, before the search box obtains the search term inputted by the user, it further comprises:

presetting a corresponding relationship between the merchandise name and the function button, and storing the corresponding relationship in a library corresponding to the server.

Preferably, regarding the method for accurately searching within a website of the invention, according to the search term, the dynamic matching unit performing query matching in different libraries on the server according to the preset query rule comprises:

a finding unit within the dynamic matching unit finding first search results obtained by matching in different libraries on the server with the search term;

a ranking unit within the dynamic matching unit ranking the first search results by utilizing weighted values of the merchandise to obtain second search results.

Further, the method for accurately searching within a website of the invention further comprises presetting the weighted values:

a first weight setting unit within the server setting first weighted values of manufacturers, and merchandises provided by the manufacturers having corresponding first weighted values;

a second weight setting unit within the server setting user types according to service contents required by the user, and setting second weighted values based on the user types;

a third weight setting unit within the server setting third weighted values of the merchandises according to attributes of the merchandises, and adjusting the third weighted values based on time when the user visits the website; and a fourth weight setting unit within the server setting fourth weighted values of the merchandises or the manufacturers according to promotion information of the merchandises or the manufacturers.

Preferably, regarding the method for accurately searching within a website of the invention, ranking the search results according to a preset ranking rule comprises:

a threshold computing unit within the dynamic matching unit comprehensively computing the first weighted values, the second weighted values, the third weighted values and the fourth weighted values of the merchandises to obtain comprehensive weighted values of the merchandises according to a preset algorithm;

ranking the search results according to the comprehensive weighted values, and the larger or smaller the weighted values are, the higher the rank is.

Further, regarding the method for accurately searching within a website of the invention, it further comprises steps of:

a monitoring unit within the server monitoring and counting ranks of the search results opened after the user searches in the pull-down list of the search box;

a weight adjusting unit within the server adjusting weighted values according to monitoring results of the monitoring unit.

Further, regarding the method for accurately searching within a website of the invention, it further comprises steps of:

judging whether the corresponding merchandise matched by the search term is the merchandise of a preset manufacturer depending on the corresponding merchandise matched by the search term;

if yes, adding the corresponding merchandise matched by the search term into the search results;

if no, finding and displaying a merchandise similar to the merchandise matched by the search term within the website.

Preferably, regarding the method for accurately searching within a website of the invention, the libraries of the server include one or more of downloading libraries, reading libraries, purchasing libraries, and searching libraries.

Preferably, regarding the method for accurately searching within a website of the invention, the function button includes one or more of download, read, purchase and search.

Preferably, regarding the method for accurately searching within a website of the invention, the function button includes function description icons and/or function description texts.

Advantageous Effects of the Invention

Advantageous Effects

Implementing the method for accurately searching within a website of the invention has the following advantageous effects: the method comprises: a search box obtaining a search term inputted by a user and sending the search term to a dynamic matching unit; according to the search term, the dynamic matching unit performing query matching in different libraries on a server according to a preset query rule to obtain search results, said search results containing a plurality of merchandise information; ranking the search results according to a preset ranking rule, and displaying the ranked search results in a pull-down list of the search box; each of the search results containing a merchandise name and a function button corresponding to the merchandise name; and clicking the function button and jumping to a preset function page corresponding to the function button, and the preset function page displaying the corresponding function information. By implementing the invention, ranking of the search results is more reasonable, and requirements of different people at different time are satisfied, while the user can rapidly perform such operations as search, read, download and purchase, so as to reduce operation steps, and improve user experience.

BRIEF DESCRIPTION OF THE DRAWINGS

Description of the Drawings

Figure 1:
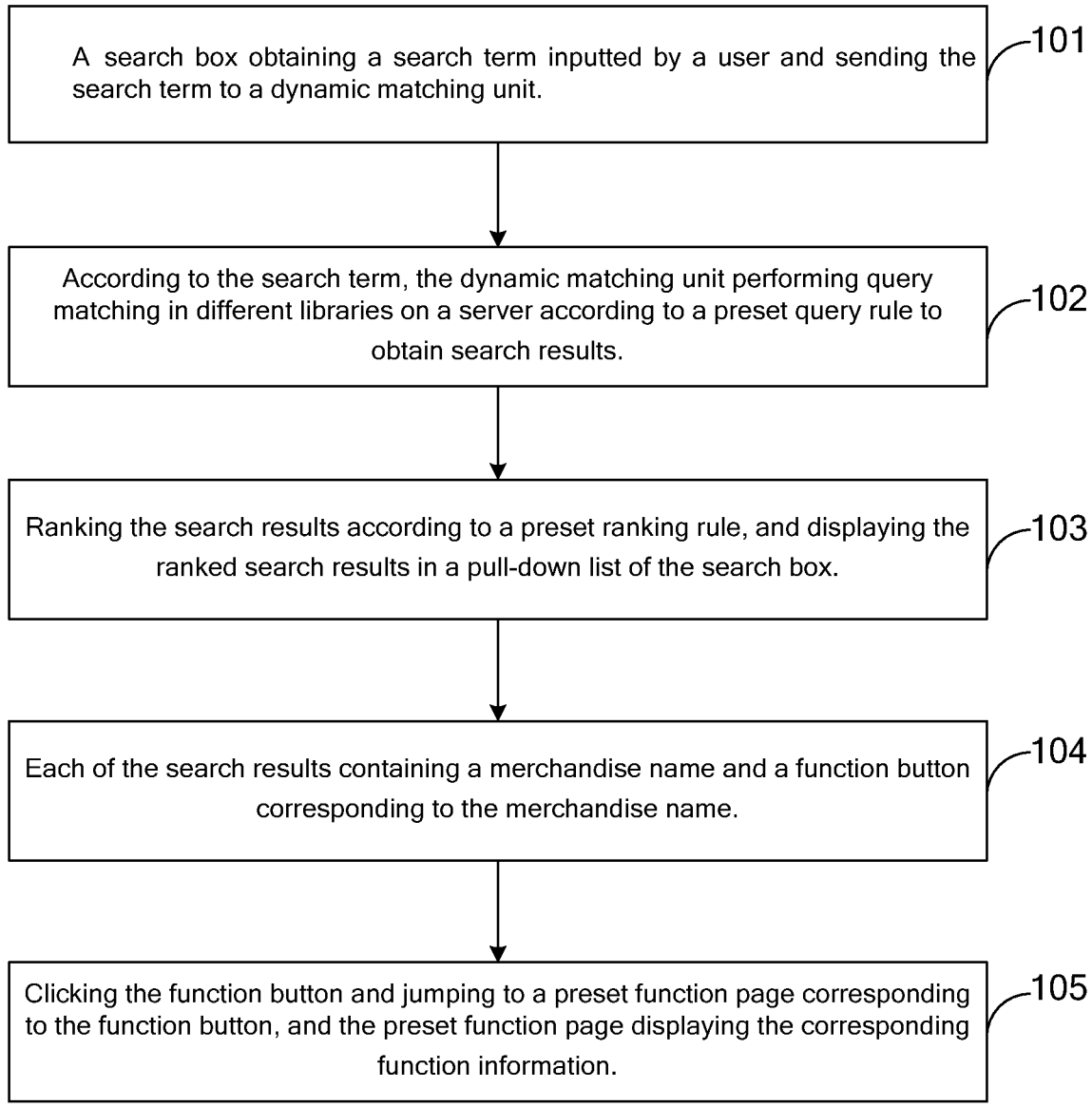

Hereinafter, the invention is further described with reference to the accompanying drawings and embodiments. In the drawings:

FIG. 1 is a flow diagram of a method for accurately searching within a website according to the invention.

Figure 2:
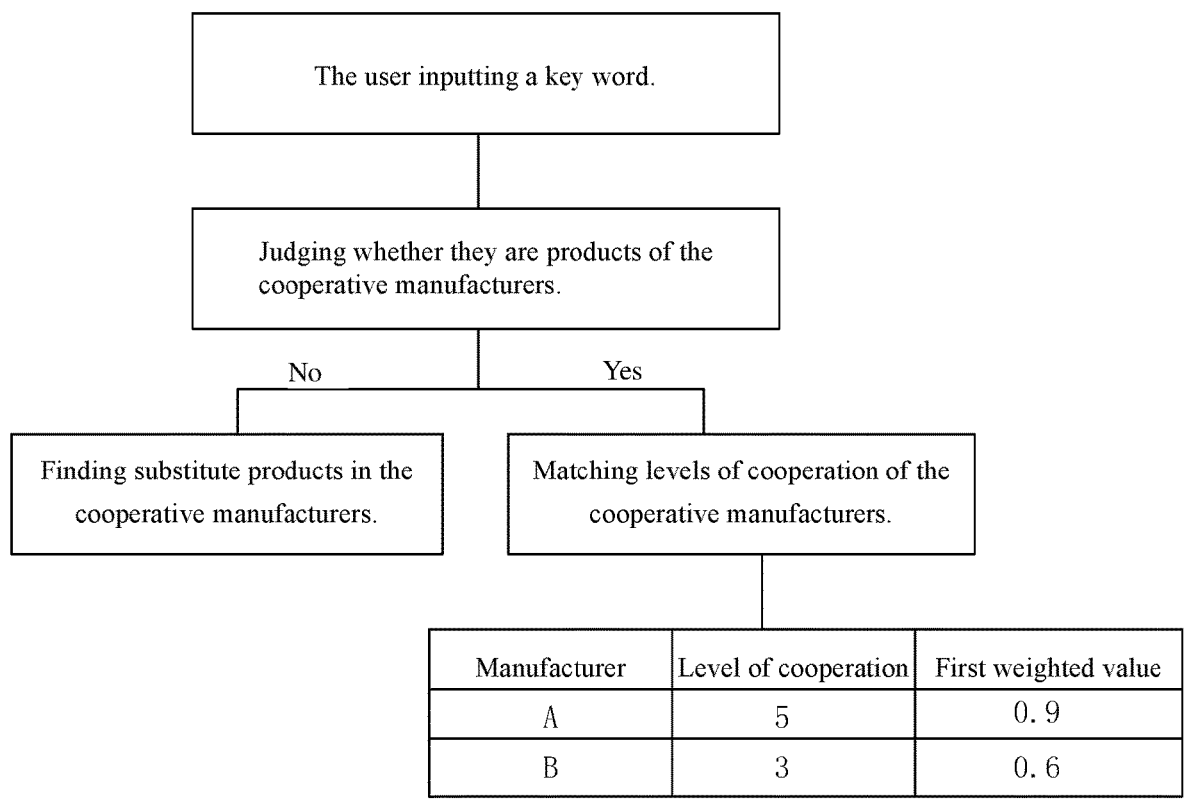
Figure 3:
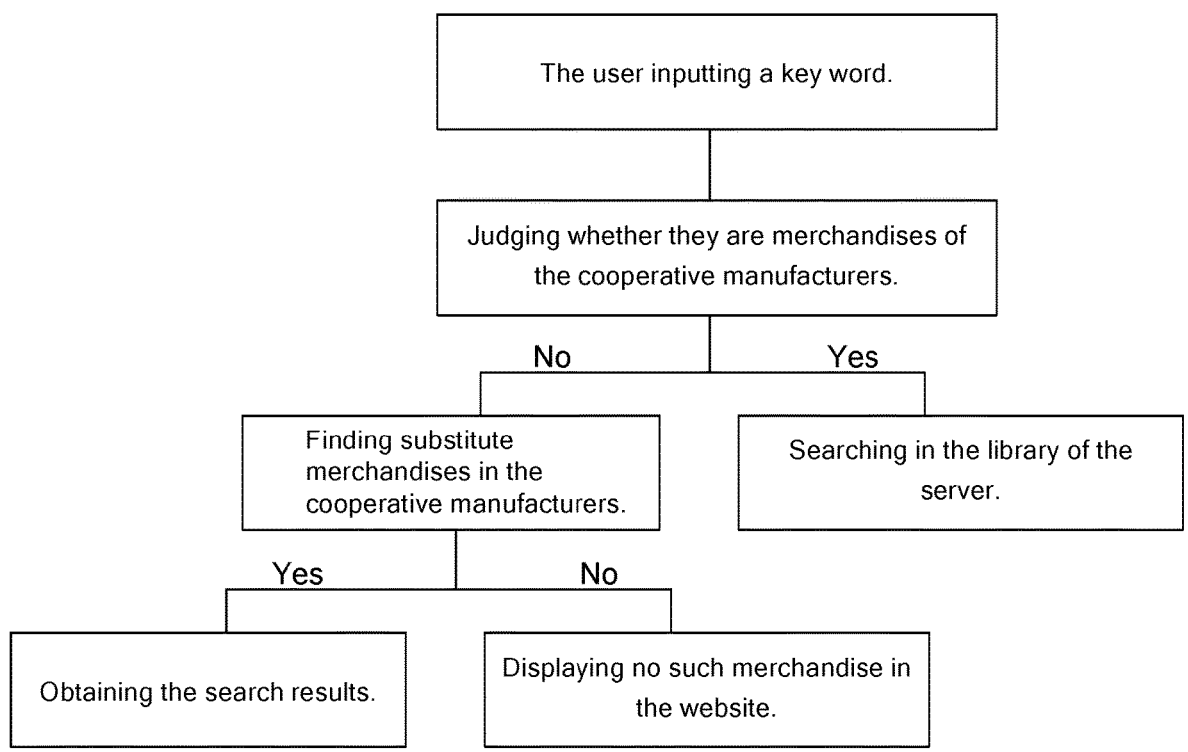
Figure 4:
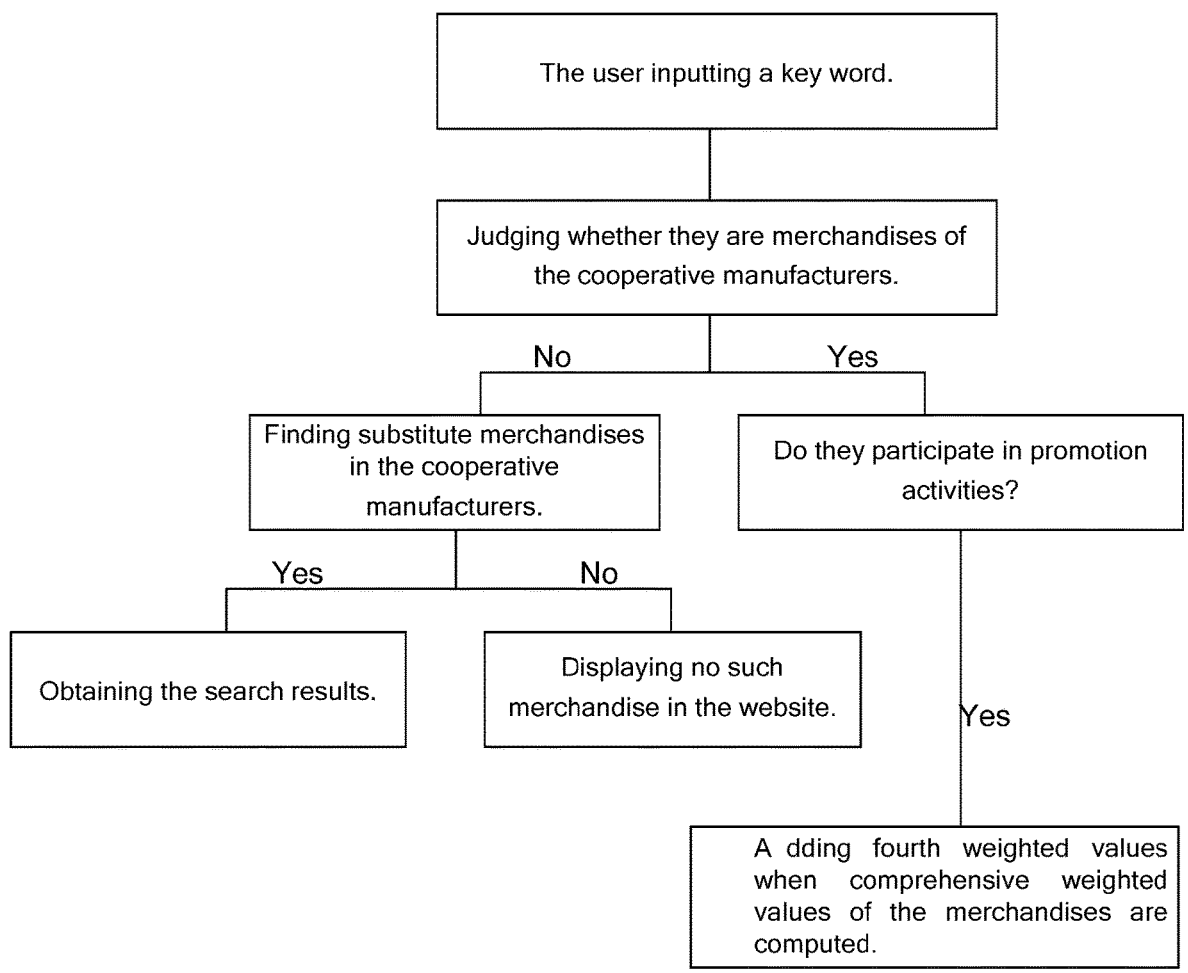

FIGS. 2-4 are flow diagrams of setting weighted values of the method for accurately searching within a website according to the invention.

Figure 5:
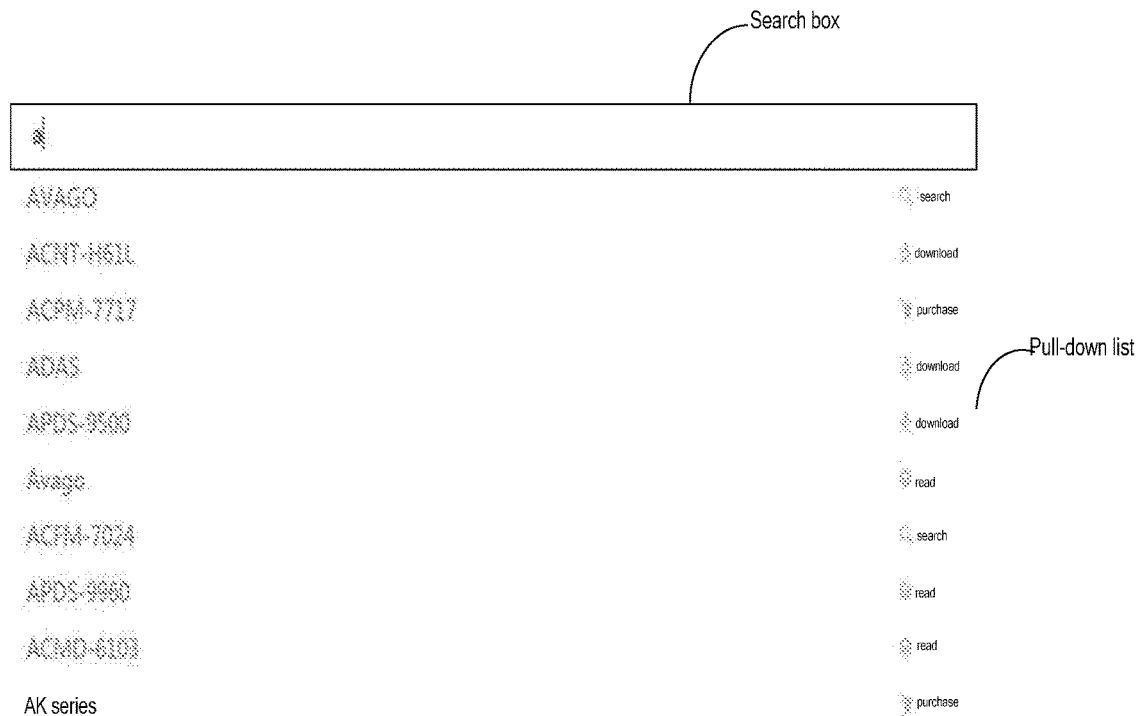
Figure 6:
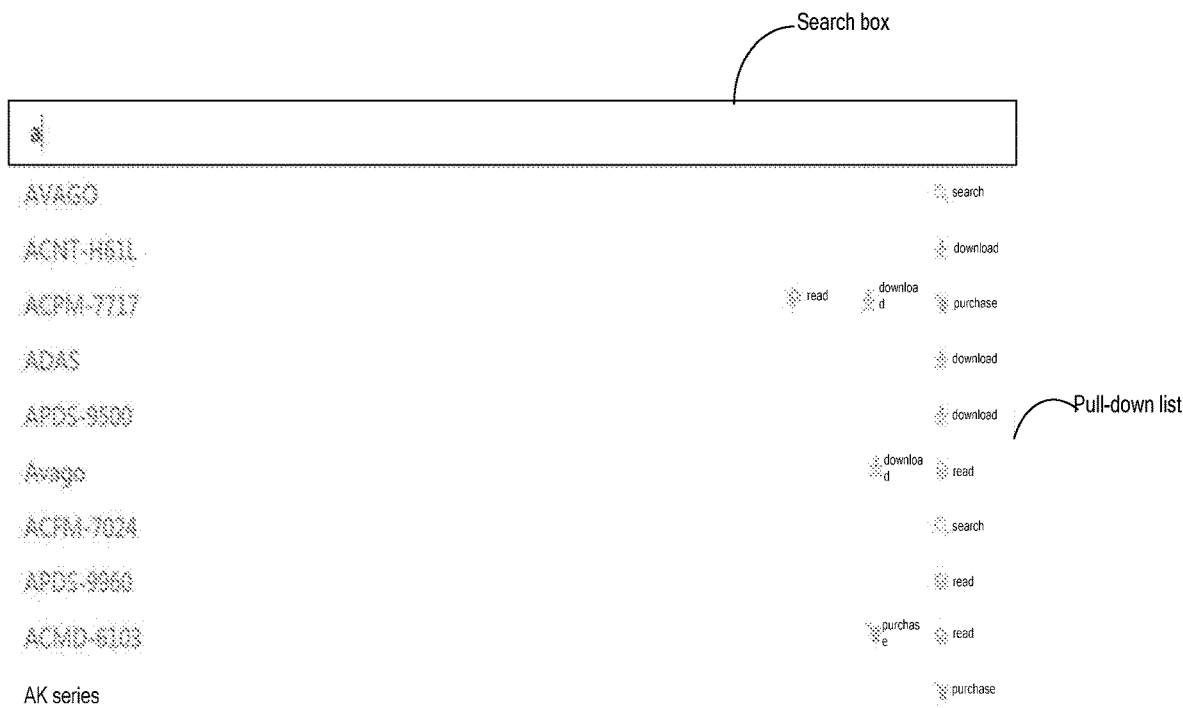

FIGS. 5-6 are schematic diagrams of a pull-down list of the method for accurately searching within a website according to the invention.

Figure 7:
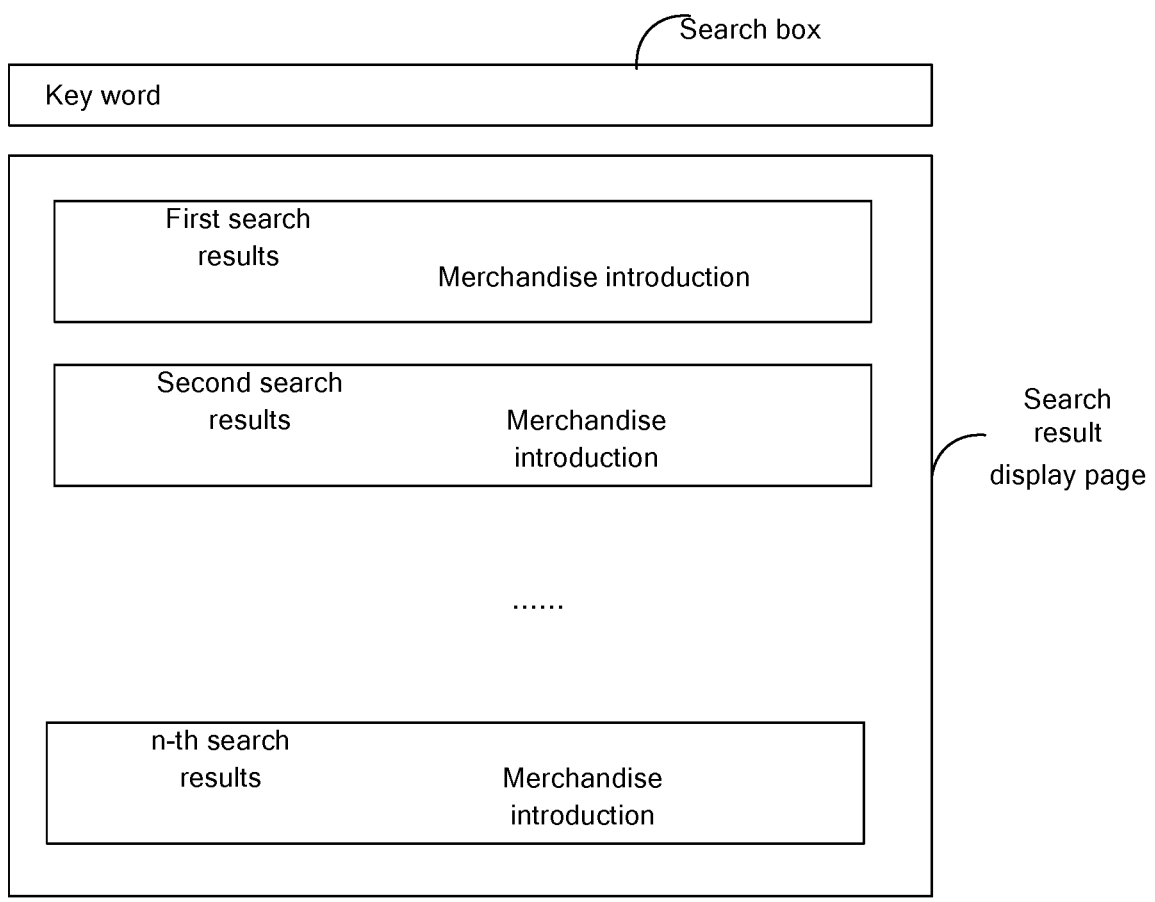

FIG. 7 is a display page corresponding to a search function button in the method for accurately searching within a website according to the invention.

Figure 8:
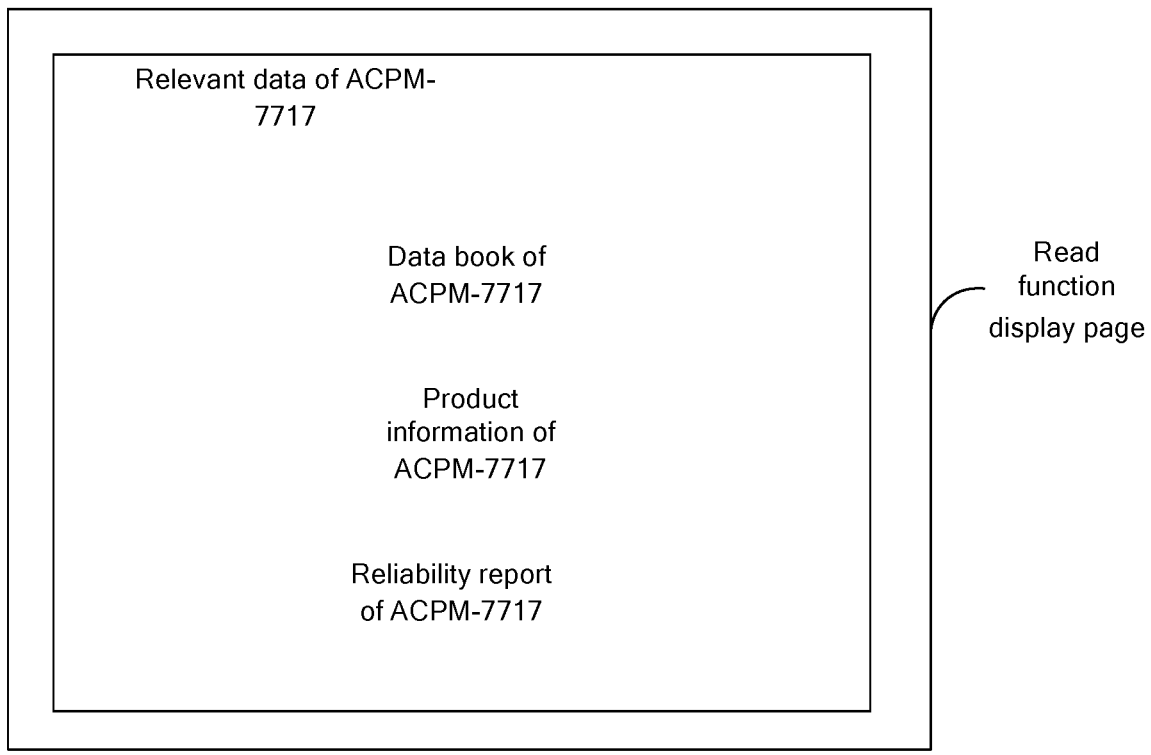

FIG. 8 is a display page corresponding to a read function button in the method for accurately searching within a website according to the invention.

Figure 9:
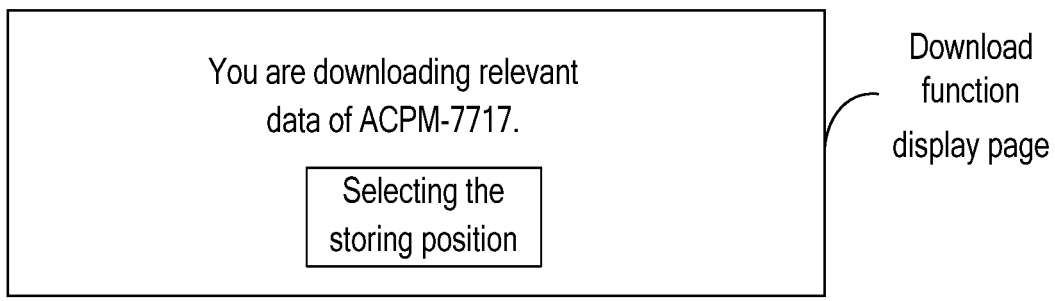

FIG. 9 is a display page corresponding to a download function button in the method for accurately searching within a website according to the invention.

FIG. 10 is a display page corresponding to a purchase function button in the method for accurately searching within a website according to the invention.

IMPLEMENTATION OF PREFERABLE EXAMPLES OF THE INVENTION

Preferable Embodiments of the Invention

To understand the technical features, objects and effects of the invention much clearer, now detailed embodiments of the invention are explicitly described with reference to the accompanying drawings.

The invention discloses a method for accurately searching within a website, which searches key words within the website, especially a merchandise selling website. The merchants put the merchandises and services corresponding to the merchandises on the website, and then, the user can view the merchandises, download relevant data of the merchandises, and place a rank to purchase the merchandises by searching. The method does not define programming language and website architecture of the website, and systems for website running includes but not limited to WINDOWS operating system, OS X operating system, Linux operating system, IOS operating system, Android operating system, and the like. The website includes customer ends (webpages) for receiving information inputted by the user, displaying the search results, and performing relevant operations, such as, download and purchase, and a server for storing merchandise data, and performing operations, such as, ranking the results according to the algorithm. The merchandises in the embodiment not only include real merchandises (i.e., physical merchandises), but also include virtual merchandises, such as, electronic documents and services. It shall be noted that the merchandise name, user and company listed in the embodiment of the invention are virtual settings, and are only used to describe the method for accurately searching within a website of the invention.

Specifically, the method comprises the steps of:

Step 101: a search box obtaining a search term inputted by a user and sending the search term to a dynamic matching unit.

Specifically, the website has a search box receiving information inputted by the user to form a search term. When needing to search a merchandise, the user inputs a search term, such as, name, model, attribute and price of the merchandise in the search box. The search box obtains the search term inputted by the user and sends the search term to a dynamic matching unit of a server. Preferably, after the user inputs one character each time, the search box sends the inputted content acting as the search term to the dynamic matching unit of the server, or after the user completes inputting, sends the inputted content acting as the search term to the dynamic matching unit of the server. Preferably, input modes of the user include but not limited to those of texts, voice, and the like.

Step 102: according to the search term, the dynamic matching unit performing query matching in different libraries on a server according to a preset query rule to obtain search results, said search results containing a plurality of merchandise information.

Specifically, the server sets a plurality of libraries according to different search terms, each library containing different search terms, and each search term is in one-to-one correspondence with the merchandise or merchandise information. After the user inputs the search term in the search box, the search term is sent to the dynamic matching unit, and according to the search term, the dynamic matching unit performs query matching in different libraries on a server according to a preset query rule to obtain search results.

Preferably, according to the search term, the dynamic matching unit performing query matching in different libraries on the server according to the preset query rule comprises:

a finding unit within the dynamic matching unit finding first search results obtained by matching in different libraries on the server with the search term. The first search results include all merchandises, merchandise data, merchandise specification, data book and reliability report that contain the search term, thereby ensuring integrity of the searched data. Preferably, only several search results ranking ahead in matching degrees can be selected according to the matching degrees during matching of the search term.

After obtaining the first search results, not all first search results are displayed, and in rank to allow the search results to be closer to the desired results of the user, the first search results are ranked. A ranking unit within the dynamic matching unit ranks the first search results by utilizing weighted values of the merchandise to obtain second search results. A comprehensive weighted value of each merchandise in the first search results is obtained through the weighted value computing method provided in the invention, and ranking is performed according to the weighted values, and then N search results (wherein N is an integer greater than 0) ranking ahead are selected to display in the pull-down list of the search box.

Preferably, the embodiment presets a plurality of weighted values, which are respectively first weighted values, second weighted values, third weighted values, and fourth weighted values, and hereinafter they are explicitly described, respectively.

A. a first weight setting unit within the server sets first weighted values of manufacturers, correspondingly, merchandises provided by the manufacturers also having corresponding first weighted values. The merchandises sold by the sellers of the website have a plurality of manufacturers, but cooperation between the sellers and each manufacturer is different. Different levels of cooperation are divided depending on different cooperation relationship, and each level of cooperation has a corresponding weighted value, i.e., the manufacturers have the first weighted values. Correspondingly, the merchandises provided by the manufacturers also have corresponding first weighted values.

Specifically, referring to FIG. 2, whether the merchandises corresponding to the search term are the merchandises provided by the cooperative manufacturers is judged according to the search term inputted by the user. If the merchandises corresponding to the search term are the merchandises provided by the cooperative manufacturers, the levels of cooperation of the cooperative manufacturers are matched. For example, the level of cooperation of the manufacturer A is 5, the corresponding first weighted value is 0.9; and the level of cooperation of the manufacturer B is 3, the corresponding first weighted value is 0.6. If the merchandises corresponding to the search term are not the merchandises provided by the cooperative manufacturers, substitute merchandises are found in the cooperative manufacturers, and for details, please refer to FIG. 3.

In FIG. 3, the substitute merchandises are found in the cooperative manufacturers. If yes, the search results are obtained, and further process is performed. If no, no related merchandise in the website are displayed. For example, the search term inputted by the user is "AA mobile phone", but the cooperative manufacturers in this website do not sell this brand of mobile phone, and the related product is searched in the cooperative manufacturers, so as to search "BB mobile phone".

Preferably, in the embodiment, it further comprises steps of:

judging whether the corresponding merchandise matched by the search term is the merchandise of a preset manufacturer depending on the corresponding merchandise matched by the search term. The preset manufacturer is a special cooperative manufacturer, and search priority of the manufacturer is set to be higher than those of other manufacturers, and when finding the search term, the merchandise of the manufacturer is searched firstly.

if yes, adding the corresponding merchandise matched by the search term into the search results;

if no, finding and displaying a merchandise similar to the merchandise matched by the search term within the website.

B. a second weight setting unit within the server setting user types according to service contents required by the user, and setting second weighted values based on the user types. The user types are set according to the service contents required by the user. Specifically, the user of the website has different roles, such as, electronics engineers, purchasing personnel, research personnel, registered users, non-registered users, and the like, and the user firstly registers member information before using the website. The member information records the user type registered by the user, such as, electronics engineers, purchasing personnel, research personnel, VIP users, non-registered users, and the like. The merchandises concerned by the users in different roles have different attributes. For example, the research personnel mostly concern about parameters of the merchandises, the purchasing personnel mostly concern about prices of the merchandises, and different second weighted values are set according to different roles of the users. For example, as shown in Table 1:

TABLE 1

| User Role | Merchandise Attribute | Second Weighted Value |
|---|---|---|
| Role A | Attribute a | 0.6 |
| Role B | Attribute b | 0.7 |
| Role C | Attribute c | 0.8 |

In Table 1, the user roles includes roles A, B and C. The second weighted value of the attribute a of the merchandise corresponding to the role A is set to be 0.6, the second weighted value of the attribute b of the merchandise corresponding to the role B is set to be 0.7, and the second weighted value of the attribute c of the merchandise corresponding to the role C is set to be 0.8.

C. a third weight setting unit within the server setting third weighted values of the merchandises according to attributes of the merchandises, and adjusting the third weighted values based on time when the user visits the website.

Specifically, every merchandise has a plurality of attributes, and different users have different requirements for different attributes, so different weighted values are set according to different attributes of the merchandise, which are third weighted values. For example, as shown in Table 2:

TABLE 2

| Merchandise Attribute | Third Weighted Value |
| --- | --- |
| Attribute a | 0.5 |
| Attribute b | 0.9 |
| Attribute c | 0.8 |

In Table 2, the third weighted value of the attribute a of the merchandise is set to be 0.5, the third weighted value of the attribute b is set to be 0.9, and the third weighted value of the attribute c is set to be 0.8.

In addition, according to counting, information required by the user is also different as time when the user visits the website is different. For example, in working time of the working days, the user mostly queries models and data of the merchandise, and purchases the merchandise, and in off-work time of the working days, or rest days, the user mostly views relevant information. Therefore, weighted values of the visiting time are set according to the time when the user visits the website. For example, as shown in Table 3:

TABLE 3

| Visiting Time | Merchandise Attribute | Weighted Value |
| --- | --- | --- |
| Working Days (on-work) | Attribute a | 0.6 |
| Working Days (off-work) | Attribute a | 0.7 |
| Non-Working Days | Attribute a | 0.8 |

In Table 3, with respect to the attribute a of the merchandise, different weighted values of the visiting time at different time are set. At on-work time of the working days, the weighted value of the visiting time of the attribute a of the merchandise is set to be 0.6, at off-work time of the working days, the weighted value of the visiting time of the attribute a is set to be 0.7, and at non-working days, the weighted value of the visiting time of the attribute a is set to be 0.8.

D. a fourth setting unit within the server setting fourth weighted values of the merchandises or the manufacturers according to promotion information of the merchandises or the manufacturers. As the e-commerce website, the merchants make discount promotions on some merchandises periodically according to stock or market, of course, the merchants expect that the discounted merchandises appear in the search results, and ranking positions are increased as far as possible. Therefore, in the embodiment, fourth weighted values of the manufacturers or merchandises participating in promotions are set, and the fourth weighted values of the manufacturers or merchandises participating in promotions are set manually.

Referring to FIG. 4, the user inputs the search term in the search box, and according to the search term, the dynamic matching unit performs query matching in different libraries on the server according to the preset query rule to judge whether they are merchandises provided by the cooperative manufacturers. If no, substitute merchandises are found in the cooperative manufacturers. If yes, whether the merchandises participate in promotion activities is viewed, and if yes, the fourth weighted values are added when comprehensive weighted values of the merchandises are computed.

In the embodiment, considering, influence factors, such as, different manufacturers, different merchandises, different attributes of the merchandises, different users, different use time of the users, through the above weighted values, i.e., the first weighted values, the second weighted values, the third weighted values and the fourth weighted values, the search results are more reasonable, and better conform to the users' expectations; and meanwhile, considering requirements of the website sellers, and interests of the sellers can be satisfied. A threshold computing unit within the dynamic matching unit comprehensively computes the first weighted values, the second weighted values, the third weighted values and the fourth weighted values of the merchandises to obtain comprehensive weighted values of the merchandises according to a preset algorithm. In the embodiment, the method of computing the comprehensive weighted values only is not defined only if respective factors are considered. Preferably, the search results are ranked according to the comprehensive weighted values, and the larger the weighted values are, the higher the rank is, or the search results are ranked according to the comprehensive weighted values, and the smaller the weighted values are, the higher the rank is.

Preferably, search permissions of the users are set according to different user types, different types of users have different search permissions, and the obtained search results are also different. For example, VIP users and ordinary users have different permissions, and VIP users can search merchandise information of some particular merchandises, while these information are not open to ordinary users.

Further, although reasonable search results can be obtained after searching with the method of the embodiment, as time, new merchandise and market change, the user requirements for merchandises are also continuously changing. Accordingly, the weighted values and permission settings in the embodiment are dynamically changing, thereby achieving timely optimization of the search results. Therefore, in the embodiment, a monitoring unit is set within the sever to monitor and count ranks of the search results opened after the user searches in the pull-down list of the search box, and evaluate whether the search results are matched with the user requirements after counting for a period of time. For example, the search list has ten merchandise information every time, and if the user selects the top five items after searching, it means that the search results conform to the user requirements. On the contrary, if the user selects merchandises ranked behind, it means that ranking is unreasonable, and the weighted values of the corresponding merchandises are adjusted after counting for a period of time, thereby increasing ranks of the merchandises corresponding to the search term. Alternatively, when the user does not see the desired results after inputting one search term, and the user searches again, it means that the current search results are quite unreasonable, and then need to be adjusted again. The sever automatically adjusts the weighted values of the merchandises corresponding to the search term according to the results clicked by the user, or reports the counting information clicked by the user to the website manager to remind the website manager to make adjustment.

Step 103: ranking the search results according to a preset ranking rule, and displaying the ranked search results in a pull-down list of the search box. After searching and ranking according to the search term, the search results ranked ahead are selected to display in the pull-down list of the search box.

Referring to FIGS. 5-6, FIGS. 5-6 are schematic diagrams of the pull-down list of the method for accurately searching within a website according to the embodiment. As can be seen from the figures, the user obtains ten search results after inputting a search term a in the search box. It shall be understood that the number of merchandises in the pull-down list can be adjusted according to needs.

Step 104: each of the search results containing a merchandise name and a function button corresponding to the merchandise name. The libraries of the server include but not limited to downloading libraries, reading libraries, purchasing libraries, searching libraries, and the like. The function button includes but not limited to download, read, purchase, search and the like. The function button includes function description icons and/or function description texts. Every search result may correspond to one or more function buttons. It shall be understood that every function button corresponds to one webpage address, and can be linked to the corresponding webpage after being clicked.

Specifically, referring to FIGS. 5-6, FIGS. 5-6 are schematic diagrams of the pull-down list of the method for accurately searching within a website according to the embodiment. Every search result in FIG. 5 has one corresponding function button, and every search result in FIG. 5 has one or more corresponding function buttons.

It shall be noted that in the sever, a corresponding relationship between the merchandise name and the function button is preset, and the corresponding relationship is stored in a library corresponding to the server.

Step 105: clicking the function button and jumping to a preset function page corresponding to the function button, and the preset function page displaying the corresponding function information.

Specifically, the user selects the required search result in the search results of the pull-down list, then click the corresponding function button, and enter into the corresponding function page. The way of entering into the corresponding function page includes but not limited to covering the current page, creating a new page, popping up a window, and the like. Preferably, when the mouse moves to the function button, the function button changes the display icon, or change the display color to remind the user of the function button to be selected.

Referring to FIGS. 7-10, FIGS. 7-10 are schematic diagrams of function pages corresponding to the function buttons.

Specifically, FIG. 7 is a display page corresponding to a search function button in the method for accurately searching within a website according to the embodiment. The user inputs a search term in the search box to obtain search results, and display them in the pull-down list after the above steps. The user clicks a "search" function button corresponding to one search result in the pull-down list to immediately jump to a search result display page, and the ranked search results are displayed on the search result display page, thereby achieving "one-step" accurate search to greatly simplify the operation steps and improve user experience.

Specifically, FIG. 8 is a display page corresponding to a read function button in the method for accurately searching within a website according to the embodiment. The user inputs a search term in the search box to obtain search results, and display them in the pull-down list after the above steps. The user clicks a "read" function button corresponding to one search result in the pull-down list to immediately jump to a read function display page, while calling a corresponding decoder to display data contents, such as, PDF document, WORD document, image, and the like, so that the user can directly read, thereby achieving "one-step" accurate read to greatly simplify the operation steps, and improve user experience.

Specifically, FIG. 9 is a display page corresponding to a download function button in the method for accurately searching within a website according to the embodiment. The user inputs a search term in the search box to obtain search results, and display them in the pull-down list after the above steps. The user clicks a "download" function button corresponding to one search result in the pull-down list to perform such download operations as immediately jumping to a download function display page, calling the corresponding download tool, popping up a download data dialog box, and displaying and selecting a storing position, thereby achieving "one-step" fast download to greatly simplify the operation steps and improve user experience.

Specifically, FIG. 10 is a display page corresponding to a purchase function button in the method for accurately searching within a website according to the embodiment. The user inputs a search term in the search box to obtain search results, and display them in the pull-down list after the above steps. The user clicks a "purchase" function button corresponding to one search result in the pull-down list to immediately jump to a purchase function display page, displaying information of the purchased merchandise and a purchase list to be filled, such as, quantity required, unit price, postal address, contact person, and the like. Preferably, if the user is a registered user, and has filled in purchase information, or has purchase history, it automatically assists the user to fill in the existing information, thereby achieving "one-step" purchase experience to greatly simplify the operation steps and improve user experience.

It shall be understood that the above fast search operations of search, read, download and purchase are only to describe the search method of the embodiment, and implementations of other functions with this method also belong to the extent of protection of the invention.

By implementing the invention, considering more factors, the weighted values of respective factors are reasonably set during search, so that ranking of the search results is more accurate and reasonable, and requirements of different people at different time are satisfied. Meanwhile, the operation steps and intermediate display links are simplified to directly connect with the user requirements, so that the user directly performs such operations as search, read, download and purchase, so as to reduce operation steps and improve user experience.

The above embodiments are only to describe the technical concepts and characteristics of the invention, and the object is to enable those skilled in the art to understand the contents of the invention and implement it, but cannot limit the extent of protection of the invention. Any equivalent variations and modifications within the range of the claims of the invention shall belong to the range covered by the claims of the invention.

What is claimed is:

1. A method for accurately searching within a website, wherein it comprises steps of:
presetting a corresponding relationship between a merchandise name and a function button, and storing the corresponding relationship in a library corresponding to a server;

a search box obtaining a search term inputted by a user and sending the search term to a dynamic matching unit;

according to the search term, the dynamic matching unit performing query matching in different libraries on the server according to a preset query rule to obtain search results, said search results containing a plurality of merchandise information, which comprising: a finding unit within the dynamic matching unit finding first search results obtained by matching in the different libraries on the server by utilizing the search term; a ranking unit within the dynamic matching unit ranking the first search results by utilizing weighted values of the merchandise to obtain second search results;

ranking the search results according to a preset ranking rule, and displaying the ranked search results in a pull-down list of the search box;

each of the search results containing the merchandise name and the function button corresponding to the merchandise name; and clicking the function button and jumping to a preset function page corresponding to the function button, and the preset function page displaying the corresponding function information;

wherein ranking the search results according to a preset ranking rule, and displaying the ranked search results in a pull-down list of the search box further comprises:

a threshold computing unit within the dynamic matching unit comprehensively computing first weighted values, second weighted values, third weighted values and fourth weighted values of a merchandises to obtain comprehensive weighted values of the merchandises according to a preset algorithm; ranking the search results according to the comprehensive weighted values, and the larger or smaller the weighted values are, the higher a rank is; wherein a first weight setting unit within the server setting the first weighted values of manufacturers, merchandises provided by the manufacturers having corresponding first weighted values; a second weight setting unit within the server setting user types according to service contents required by the user, and setting the second weighted values based on the user types; a third weight setting unit within the server setting the third weighted values of the merchandises according to attributes of the merchandises, and adjusting the third weighted values based on time when the user visits the website; and a fourth setting unit within the server setting the fourth weighted values of the merchandises or the manufacturers according to promotion information of the merchandises or the manufacturers; setting search permissions of the users according to different user types, wherein different types of users have different search permissions, and obtained search results are also different;

a monitoring unit within the server monitoring and counting ranks of the search results opened after the user searches in the pull-down list of the search box and evaluating whether the search results are matched with the user requirements after counting for a period of time, if no, a weight adjusting unit within the server adjusting weighted values according to monitoring results of the monitoring unit.

2. The method for accurately searching within a website according to claim 1, wherein it further comprises steps of:
judging whether the corresponding merchandise matched by the search term is the merchandise of a preset manufacturer depending on the corresponding merchandise matched by the search term;
if yes, adding the corresponding merchandise matched by the search term into the search results;
if no, finding and displaying a merchandise similar to the merchandise matched by the search term within the website.

3. The method for accurately searching within a website according to claim 1, wherein the libraries of the server include one or more of downloading libraries, reading libraries, purchasing libraries, and searching libraries.

4. The method for accurately searching within a website according to claim 1, wherein the function button includes one or more of download, read, purchase and search.

5. The method for accurately searching within a website according to claim 4, wherein the function button includes function description icons and/or function description texts.

* * * * *